United States Patent [19]
Malecek

[11] Patent Number: 5,731,568
[45] Date of Patent: Mar. 24, 1998

[54] BATTERY HEATING DEVICE AND METHOD

[75] Inventor: Edward L. Malecek, Delano, Minn.

[73] Assignee: Arctic Fox, Inc., Delano, Minn.

[21] Appl. No.: 542,640

[22] Filed: Oct. 13, 1995

[51] Int. Cl.$^6$ .............. H05B 3/00; H01M 2/10; B60R 16/04
[52] U.S. Cl. .......... 219/209; 429/100; 180/68.5
[58] Field of Search ................ 219/200, 202, 219/209, 520, 521, 536, 538, 540, 552, 553; 429/100, 120, 62; 180/68.5

[56] References Cited

U.S. PATENT DOCUMENTS

| | | | |
|---|---|---|---|
| 2,626,971 | 1/1953 | Mansoff | 429/120 |
| 3,110,633 | 11/1963 | Bachmann | 429/120 |
| 3,594,547 | 7/1971 | Quinn | 219/209 |
| 3,623,916 | 11/1971 | Toyooka et al. | 219/544 |
| 4,591,692 | 5/1986 | Wightman | 219/209 |
| 4,600,665 | 7/1986 | Sanders | 429/120 |
| 4,738,906 | 4/1988 | Sanders | 429/120 |
| 4,926,106 | 5/1990 | Tanis | 219/209 |
| 4,964,376 | 10/1990 | Veach et al. | 123/557 |
| 5,017,758 | 5/1991 | Kirkman et al. | 219/205 |
| 5,039,927 | 8/1991 | Centafanti | 429/62 |
| 5,281,792 | 1/1994 | Lee et al. | 219/209 |
| 5,443,926 | 8/1995 | Holland et al. | 429/120 |

FOREIGN PATENT DOCUMENTS

PCT/US93/01471 8/1994 WIPO.

OTHER PUBLICATIONS

Arctic Fox BH-3100 Series Battery Heater brochure, May 1995.
Watlow Electric Heating Technology PC 9091 brochure/catalog, pp. 106-117, 1991.

Primary Examiner—Teresa J. Walberg
Assistant Examiner—Sam Paik
Attorney, Agent, or Firm—Patterson & Keough, P.A.

[57] ABSTRACT

A battery heating device for delivery thermal energy to at least one vehicle battery includes a battery support plate for supporting the battery, a heatable fluid tube supported underneath the battery support plate for transferring thermal energy from heatable fluid, such as engine coolant, to the battery, and one or more electric heating pads secured to the battery support plate to transfer thermal energy to the battery. The heatable fluid tube preferably is secured to the battery support plate by a continuously distributed, thermally conductive adhesive material, to enhance heat transfer to the battery via the battery support plate. The heatable fluid tube is constructed and disposed to be a non-weight-bearing member, to reduce the likelihood of engine coolant leakage.

18 Claims, 8 Drawing Sheets

BATTERY HEATING DEVICE AND METHOD

CROSS-REFERENCE TO RELATED APPLICATION

This application is directed to subject matter that is related to the subject matter of commonly assigned, U.S. application Ser. No. 08/012,278, filed Feb. 1, 1993, now U.S. Pat. No. 5,611,392, which is incorporated herein by reference.

BACKGROUND OF THE INVENTION

1. Field of the Invention

The invention relates to battery heating devices and methods, and more particularly, to battery heating devices and methods that transfer thermal energy to batteries of vehicles or pieces of equipment that are designed to operate in cold-weather environments.

2. Description of Related Art

Cold-weather operation of vehicles and other equipment is adversely affected by diminished cranking power of a battery system used to provide start-up power. Diminished cranking power is most noticeable with ambient temperatures below 32° Fahrenheit, although any temperature below approximately 50° Fahrenheit can have an adverse affect. The optimum temperature range, in which the typical battery system can accept the greatest amount of charge, is known to be approximately 50°–80° Fahrenheit.

Figure 10:
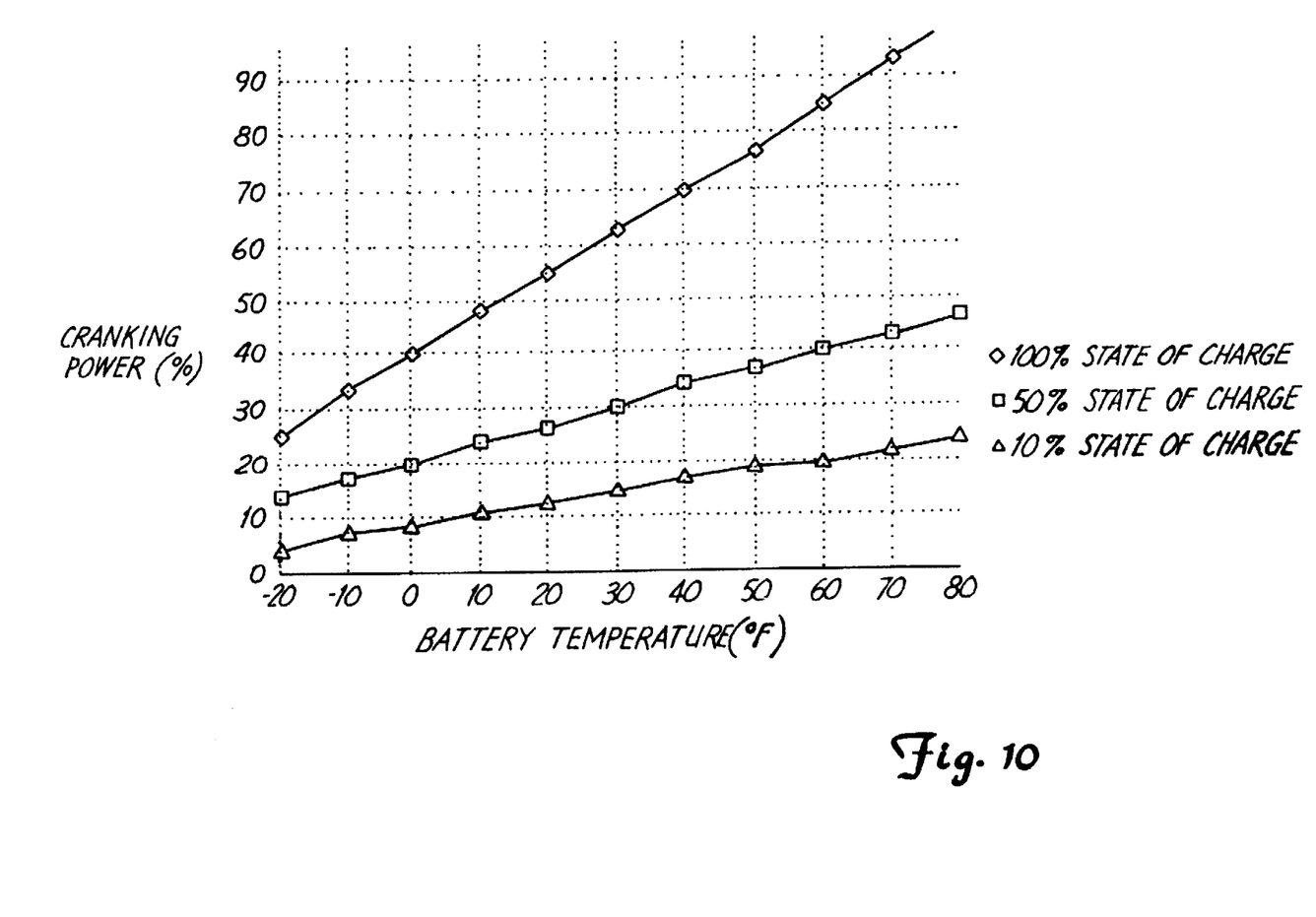
FIG. 10 is a chart illustrating cranking power degradation with decreasing temperature.

FIG. 10 demonstrates the reduced cranking power available from fully charged, half-charged, and one-tenth-charged battery systems as temperature decreases. Of course, a cold-weather environment also increases start-up frictions within the vehicle. Cranking power thus is reduced at the very time increased cranking power is demanded. Cold temperatures also inhibit battery systems from being fully recharged during recharging operations.

Extended vehicle shut-off periods such as overnight and over-weekend shutdowns heighten the problem, due to parasitic loads placed on the battery system. In a typical overnight situation, the battery system of a shut-down tractor-trailer, for example, can experience a fifteen amp parasitic load, due to power-hungry devices such as coolers, televisions, radios, lights, electric blankets and the like. Multiplied by eight hours, this fifteen amp parasitic load results in a 120 amp-hour overnight discharge. As typical battery systems store between 250 and 350 amp-hours, an overnight discharge can represent a significant decrease in the state of charge.

The parasitic load problem is magnified in a weekend shut-down situation. Although a typical over-weekend parasitic load might be only five amps, for example due to a small cooler, clock, and/or other such devices, a five amp parasitic load over sixty weekend hours results in a 300 amp-hour battery discharge. This over-weekend discharge will significantly if not totally drain many battery systems, and a cold-weather environment only magnifies the problem.

To minimize the effects of low ambient temperature on cranking power output, a number of battery heating systems have been developed. One such system is shown in U.S. Pat. No. 3,110,633 to Bachmann, which is incorporated herein by reference. Bachmann surrounds the batteries of a typical battery system with a phase-change material, contained in a specially designed reservoir. A series of heating coils containing engine coolant are directed through the reservoir to heat the phase-change material while the engine is running. The phase-change material absorbs heat from the coils and thereby liquifies. After vehicle shut-down, the phase-change material solidifies over time and thereby delivers heat to the battery system, increasing the cranking power available for start-up.

Phase-change battery heating systems such as Bachmann's, however, suffer a number of disadvantages. Providing a phase-change material and a reservoir for storing it are relatively expensive propositions. In many cases, a brand new battery box design must be implemented for a specific vehicle application. Due to the volume of phase-change material required, designs like the Bachmann design cannot be implemented on existing vehicles without significant effort and expense. Even if a redesign to accommodate a phase-change material reservoir is accomplished, the resulting system is relatively bulky and difficult to place within the confines of an engine compartment.

In addition to phase-change battery heating systems, electrical heating systems also are available. U.S. Pat. No. 5,039,927 to Centafanti, for example, which is incorporated herein by reference, discloses a conventional motor vehicle storage battery provided with a heater powered by a secondary storage battery that delivers power to the heater whenever temperature in the chamber surrounding the motor vehicle battery drops to a predetermined point. This system and others like it, however, also suffer a number of disadvantages. For example, pure electric battery healing is a power-intensive method of delivering thermal energy and requires a significant power source. The secondary storage battery of Centafanti, for example, must therefore be of significant volume and weight. Space for the secondary battery would have to be provided somewhere within the vehicle, making retrofit of existing vehicles especially difficult. Additionally, the alternator or other charging device used must charge not only the primary battery but the secondary battery as well, placing additional load on the charging system. Further, if an alternating current charging system is used instead of a secondary battery, the battery system must be connected to a power cord from the alternating current source, making over-road battery warming impossible.

Finally, in addition to phase-change and electric systems, battery heating systems are known that employ engine coolant as the heat source. Like the other applications, however, many typical coolant-healing designs are disadvantageous for a number of reasons. One such design uses a coolant reservoir in the shape of a pan having a flat cover. The pan includes internal baffles, around which the coolant flows. Although the coolant reservoir results in relatively even heat transfer to the battery system, the reservoir itself bears the weight of the batteries and potentially bears the weight of other structural elements as well. This load on the reservoir subjects the reservoir to flexing stresses, which eventually can cause coolant leakage.

Additionally, coolant battery heaters may use a temperature probe to sense when battery heating is or is not necessary. But placing the temperature probe too close to the coolant reservoir can result in thermal contamination of the temperature probe. Instead of sensing the temperature of the battery or battery housing, the probe senses the temperature of heated coolant reservoir, resulting in early shut-down of the battery heating system.

Finally, coolant-based battery heating systems, used alone or used with phase-change systems, fail to maintain battery temperature at an optimum level, such as 80° Fahrenheit, over an extended period of shut-down in a cold-weather environment. Failure to maintain optimum battery temperature inhibits the battery system from being filly recharged during a recharging cycle, intensifying the reduced cranking power problems discussed above.

SUMMARY OF THE INVENTION

To address the above and other problems and disadvantages, a battery heating device according to an embodiment of the invention includes a battery support plate for supporting at least one battery, and a heatable fluid accommodating device, such as a tube, thermally coupled with the battery via the battery support plate. Thermal energy is transferred from the heatable fluid to the battery, preferably through the battery support plate or some other structure. The battery heating device also includes an electric heating device, such as an electric heating pad, thermally coupled with the battery via the battery support plate. According to this embodiment, using a heatable fluid in combination with an electric heating device incorporates the advantages of both the electric- and coolant-heating approaches, while minimizing their respective disadvantages in a manner not taught or suggested by the prior art.

According to another aspect of the invention, a heatable fluid accommodating tube of a battery heating device is secured to a surface of a battery support plate with a preferably continuous, thermally conductive adhesive. The adhesive promotes thermal energy transfer from the heatable fluid to the battery. According to a preferred embodiment, the thermally conductive adhesive is an epoxy resin.

According to another aspect of the invention, the electric heating device includes a heat-generating pad secured to the battery support plate. The fluid-accommodating tube preferably is bent to form at least one loop, and the heat-generating pad can be disposed within the loop. The fluid-accommodating tube also preferably includes at least two legs and at least one cross-brace secured between the at least two legs to provide enhanced securement to the battery support plate.

A battery heating device according to another embodiment of the invention is connected to a fluid transfer system, such as the coolant loop of a vehicle engine. A bypass thermostat regulates coolant flow to the battery heating device, bypassing the battery heating device by shutting off the flow to it when battery temperature reaches an acceptable level.

Finally, a battery heating method according to an embodiment of the invention includes the steps of supporting at least one battery with a battery support plate, transferring thermal energy to the battery from a heatable fluid, and transferring thermal energy to the battery from an electric heating device.

BRIEF DESCRIPTION OF THE DRAWINGS

Preferred embodiments of the invention will be described with reference to the Figures, in which like reference numerals denote like elements and in which.

DETAILED DESCRIPTION OF PREFERRED EMBODIMENTS

The disclosed battery heating devices and systems in which they are incorporated can be used in a variety of applications. Typically, a battery or batteries being heated by the disclosed embodiments are used in vehicles or equipment that are subject to extreme cold-weather environments. The present invention is not limited to batteries, vehicles and such equipment, however. The present invention also is applicable to charge storage devices and other devices that require a certain elevated temperature level for efficient operation. The present invention also is applicable to vehicles, equipment and other machines used in any environment where ambient temperature drops below a desired level. Thus, while preferred embodiments of the invention may be described with respect to batteries, vehicles and equipment in cold-weather environments, the invention is not limited to these particular embodiments.

FIGS. 1-5 illustrate a battery heating device according to an embodiment of the invention. Battery heating device 5 includes a preferably planar support plate 7, which has lower and upper surfaces 8, 9. Upper surface 9 of battery support plate 7 is designed to receive and support one or more batteries in a predetermined location. Battery support plate 7 preferably is formed of a thermally conductive material such as aluminum, although of course other suitable materials, such as stainless steel, also can be used. Additionally, although battery support plate 7 according to the illustrated embodiment is of rectangular shape, battery support plate 7 can be formed of any desired shape as needed to adequately support a battery or battery pack in a given vehicle or other application. Likewise, battery support plate 7 need not be of planar configuration, but can be formed with ridges, borders, elevations and/or depressions in order to most effectively support the battery or battery pack of the vehicle.

Battery heating device 5 also includes a heatable fluid accommodation device 10, which in the illustrated embodiment is a tube formed of stainless steel or other suitable thermally conductive material. Tube 10 includes a fluid inlet 15 and fluid outlet 20, preferably spaced a predetermined distance apart by spacing element 23. As will be appreciated by those skilled in the art, inlet 15 and outlet 20 can be reversed, so that heatable fluid such as engine coolant flows into tube 10 at 20 and from tube 10 at 15. Inlet 15 and outlet 20 preferably are connected to an engine coolant flow system of the vehicle or equipment in which battery heating device 5 is used, as will be described below. Additionally, it will be appreciated that the heatable fluid within tube 10 can comprise fluids other than engine coolant, such as vehicle exhaust. Fluid accommodating device 10 can also be in the form of a heatable fluid reservoir in which heatable fluid remains or through which heatable fluid flows.

Heatable fluid accommodating tube 10 includes a desired number of 90-degree bends 25 and 180-degree bends 30, as needed to direct tube 10 to cover a significant portion of lower surface 8 of battery support plate 7. Of course, bends of other angles also can be used, such as 30-degree bends, 45-degree bends or any other desired angle. Bends 25, 30 separate tube 10 into a plurality of legs 35, and legs 35 and bends 25, 30 form a loop or a plurality of loops underneath battery support plate 7. For purposes of this description, tube 10 illustrated in FIG. 1 can be considered to form one U-shaped loop, or to form a plurality of straight loops.

Figure 1:
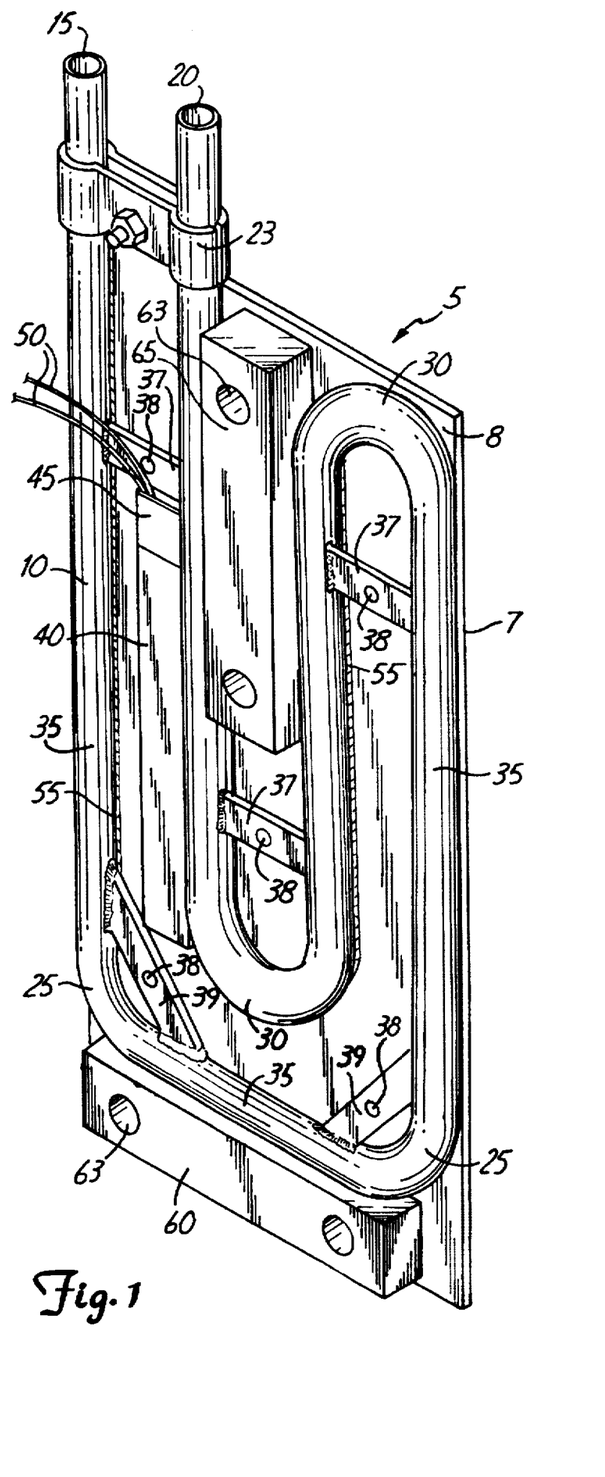
FIG. 1 is a perspective view of a battery heating device according to an embodiment of the invention.
Figure 2:
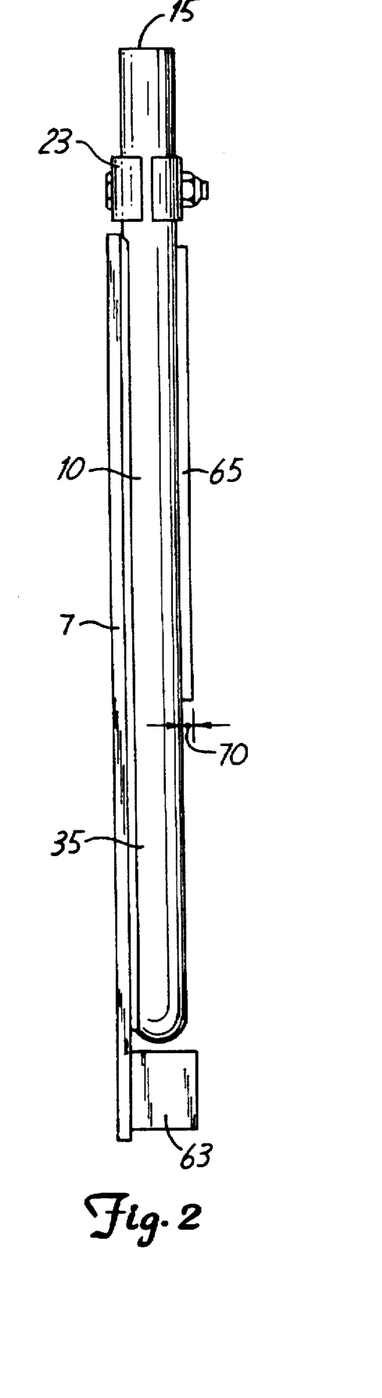
FIG. 2 is a side view of the FIG. 1 battery heating device.
Figure 3:
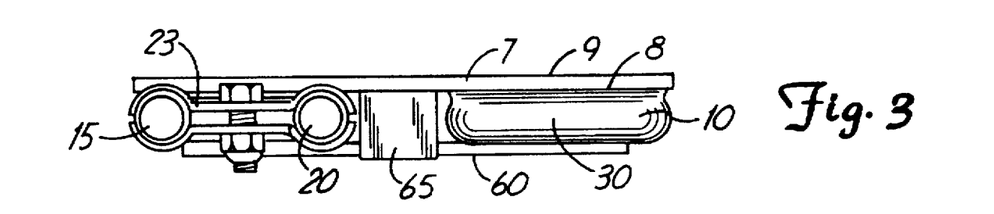
FIG. 3 is an end view of the FIG. 1 battery heating device.
Figure 4:
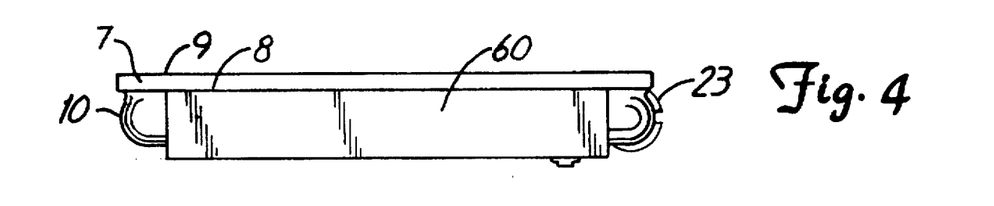
FIG. 4 is another end view of the FIG. 1 battery heating device.
Figure 5:
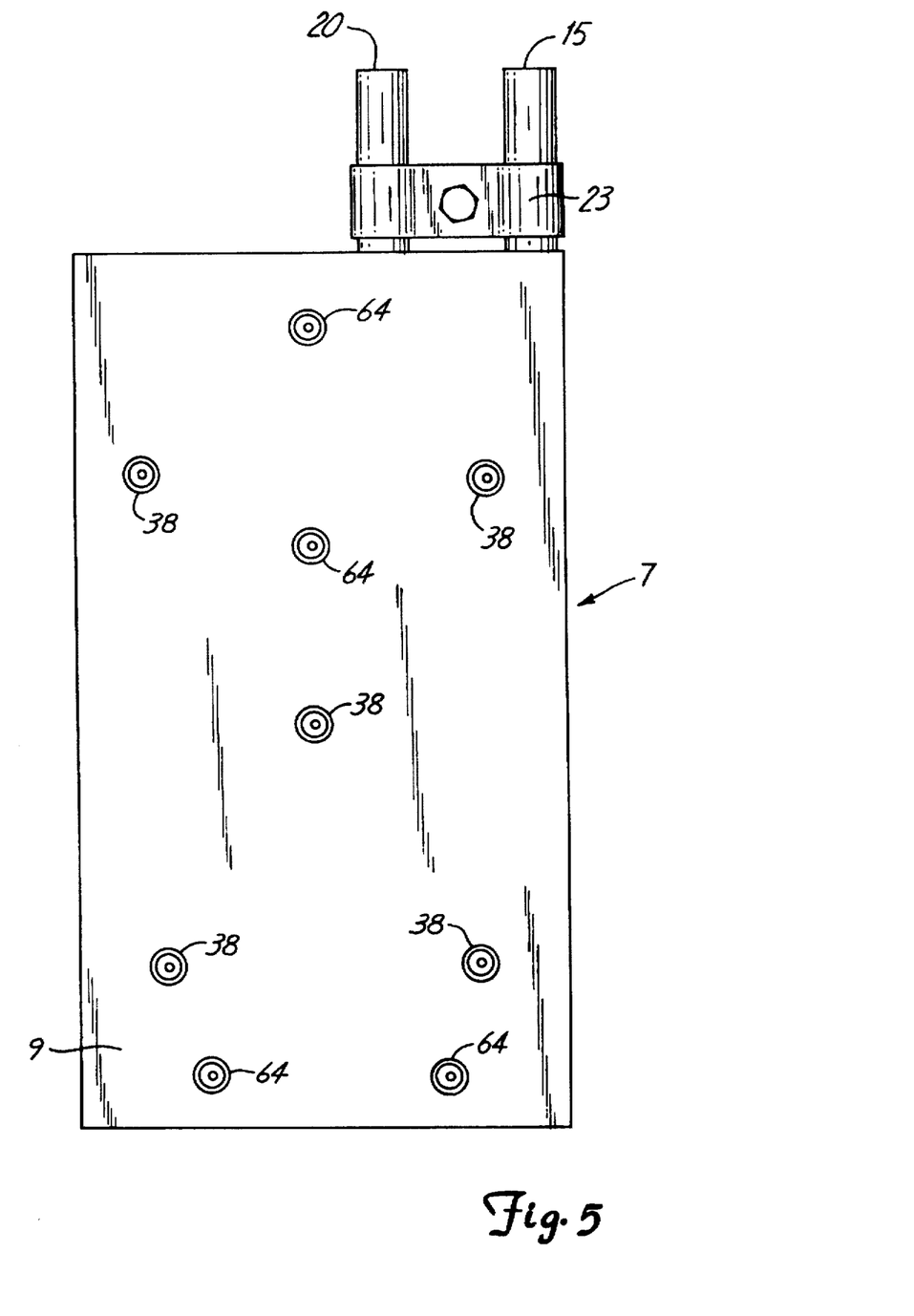
FIG. 5 is a plan view of the FIG. 1 battery heating device.

Extending between the various legs 35 of heatable fluid accommodating tube 10 are straight cross-braces 37 and angled cross-braces 39, which are secured to battery support plate 7 by rivets, screws, studs or similar securing elements 38. Tube 10 preferably also is secured to battery support plate 7 by a thermally conductive adhesive 55, as will be described.

Using tube 10 to route heatable fluid under a wide area of battery support plate 7 overcomes a typical disadvantage of prior coolant-based battery heating devices that use a coolant reservoir in the form of a pan, for example. Specifically, because tube 10 is secured to and supported by lower surface 8 of battery support plate 7, tube 10 does not bear the weight of battery support plate 7, the batteries, and any other structure supported by battery support plate 7. Thus, tube 10 is unlikely to flex and otherwise be subject to weight stresses associated with typical prior systems, and is therefore less likely to rupture or leak. In other words, fluid accommodating device 10 is independent of the structure that bears the weight of the battery or batteries of the vehicle, such as battery support plate 7; fluid accommodating device 10 thus is a non-weight-bearing structure. This represents a significant advantage over typical systems, in which structures accommodating fluid are also weight-bearing structures, are subject to considerable stress, and thus are subject to fluid leaks. Such leaks, of course, are extremely disadvantageous.

To further prevent tube 10 from bearing the weight of battery support plate 7 and other structures, battery heating device 5 also includes at least one support device, such as skids 60, 65. Skids 60, 65, which preferably are formed of plastic but of course can be formed of any suitable material, preferably are secured to lower surface 8 of battery support plate 7 by rivets, studs or similar fasteners 64, which extend through bores 63. Skids 60, 65 preferably have a height dimension that is greater than a height dimension of heatable fluid tube 10, to prevent contact of heatable fluid tube 10 with any underlying structure. This height dimension differential is illustrated at 70 in FIG. 2 and, according to a preferred embodiment, can be less than one inch. Of course, height dimension differential 70 can vary as needed to fit a particular application.

Although in the illustrated embodiment skids 60, 65 are disposed outside the loop or loops formed by tube 10, and although skid 65 is oriented perpendicularly to skid 60, other configurations and positioning of skids 60, 65, or an alternative number of skids 60, 65, also are contemplated according to the invention and will be readily apparent to one of ordinary skill.

To further overcome the disadvantages associated with pure coolant-associated battery heating devices, battery heating device 5 according to the invention also includes an electric heating device 40 to generate thermal energy for transfer to the battery or bakeries supported by battery support plate 7. Electric heating device 40 preferably is in the form of an electric heating pad, which, according to one embodiment, can be constructed in accordance with U.S. Pat. No. 5,017,758 to Kirkman et al., the disclosure of which is incorporated herein by reference. Pad 40 can include a temperature sensing device 45 for connection to a system thermostat, as will be described. Alternatively, pad 40 can be used with a remote temperature sensing device, also as will be described.

Although FIG. 1 illustrates only one pad 40, an electric heating device according to the invention can include two or more pads 40. Additional pads can be located within the right-hand loop of tube 10, as viewed in FIG. 1, or within the bottom loop thereof. Additionally, a pad or pads 40 also can be located outside the perimeter defined by tube 10, if desired. Whether one or more than one pad 40 is used, and wherever it is positioned, it is preferred that pad 40 be securely fastened to the lower surface 8 of battery support plate 7. By securely fastening pad or pads 40 to battery support plate 7, and by locating pad or pads 40 within a region of thermal conductivity with the battery or batteries supported by battery support plate 7, the heat generated by pad or pads 40 is effectively transferred through battery support plate 7 to the battery or batteries.

As will be evident to one of ordinary skill, a variety of power sources can be used to provide electrical energy to pad 40, for example by leads 50. A 110 volt or 220 volt alternating current power source can be used, as can a twelve or twenty-four volt direct current source as from a vehicle battery, for example. In the case of direct current, the batteries supported by battery support plate 7 can be used as the power source, or an external battery can also be used.

Each electric heating pad 40 can be secured to battery support plate 7 in a variety of ways, for example with an RTV silicone adhesive, a pressure-sensitive adhesive, or by direct vulcanization to battery support plate 7, for example. Direct vulcanization is preferable in at least one aspect, in that the pads can be secured to the plate during manufacture of the plate.

Heatable fluid tube 10 preferably is secured to lower surface 8 of battery support plate 7 by a thermally conductive adhesive 55, preferably continuously disposed between tube 10 and battery support plate 7. Alternatively, adhesive 55 can be applied discontinuously, that is, in discrete segments. Thermally conductive adhesive 55 preferably is an epoxy casting resin or other type of epichlorohyrdin reaction product, such as OXY-BOND 153 resin available from Resin Technology Group, Inc., South Easton, Mass.

Fastening tube 10 to battery support plate 7 with a continuous, thermally conductive adhesive 55 yields significant advantages. Thermal energy from the heatable fluid within tube 10 is conveyed to battery support plate 7 over a greater area than if tube 10 simply were spot-welded to battery support plate 7. Additionally, adhesive 55 eliminates the need for welding tube 10 in the first instance, which could compromise the structural integrity of tube 10 and/or battery support plate 7.

Figure 6A:
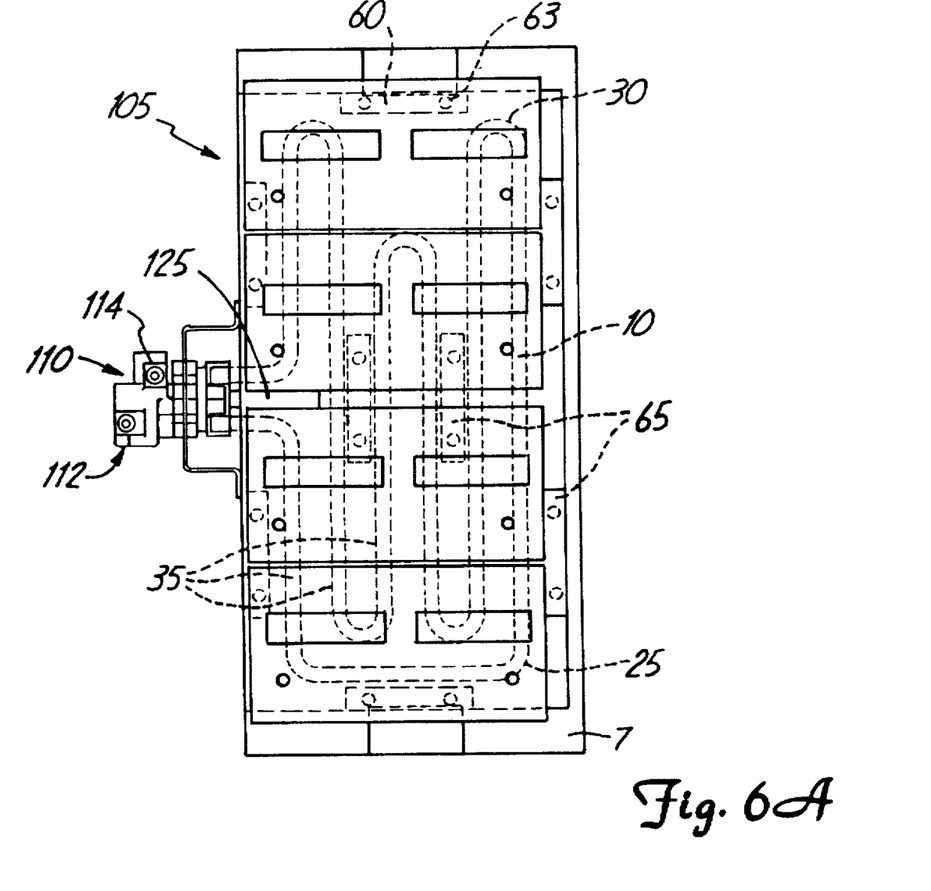
FIGS. 6A-6B are top and side views, respectively, of a battery heating device according to an embodiment of the invention.
Figure 6B:
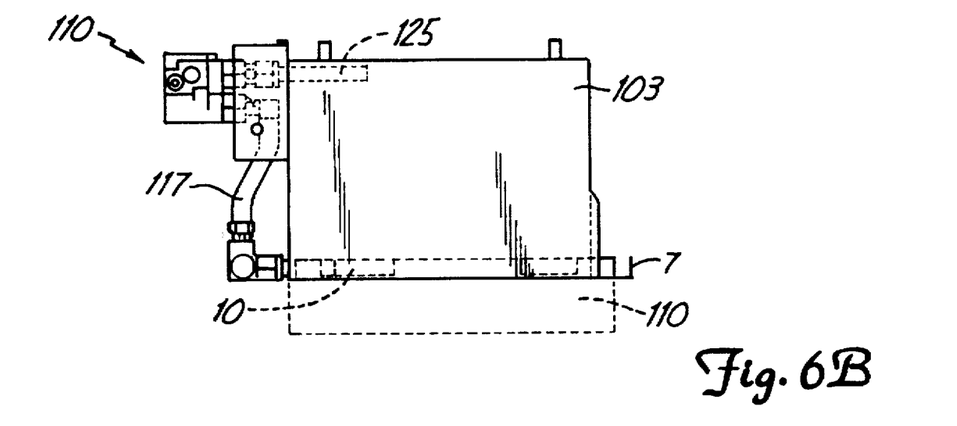

FIGS. 6A–6B disclose a battery heating device according to an alternate embodiment of the invention, in a battery heating system including a bypass thermostat. The system illustrated in FIGS. 6A–6B includes battery heating device 105, which is designed to accommodate four batteries 103 in the illustrated embodiment. Looped tube 10 runs back and forth beneath battery support plate 7 in a manner similar to that illustrated and described with respect to the embodiment of FIGS. 1–5. Similarly, a plurality of skids 60, 65 support battery support plate 7 and tube 10 a predetermined distance above any underlying structure, so that tube 10 does not bear the weight of batteries 103. Tube 10 and skids 60, 65 preferably are secured to battery support plate 7 in a manner similar to that illustrated and described previously.

Figure 8:
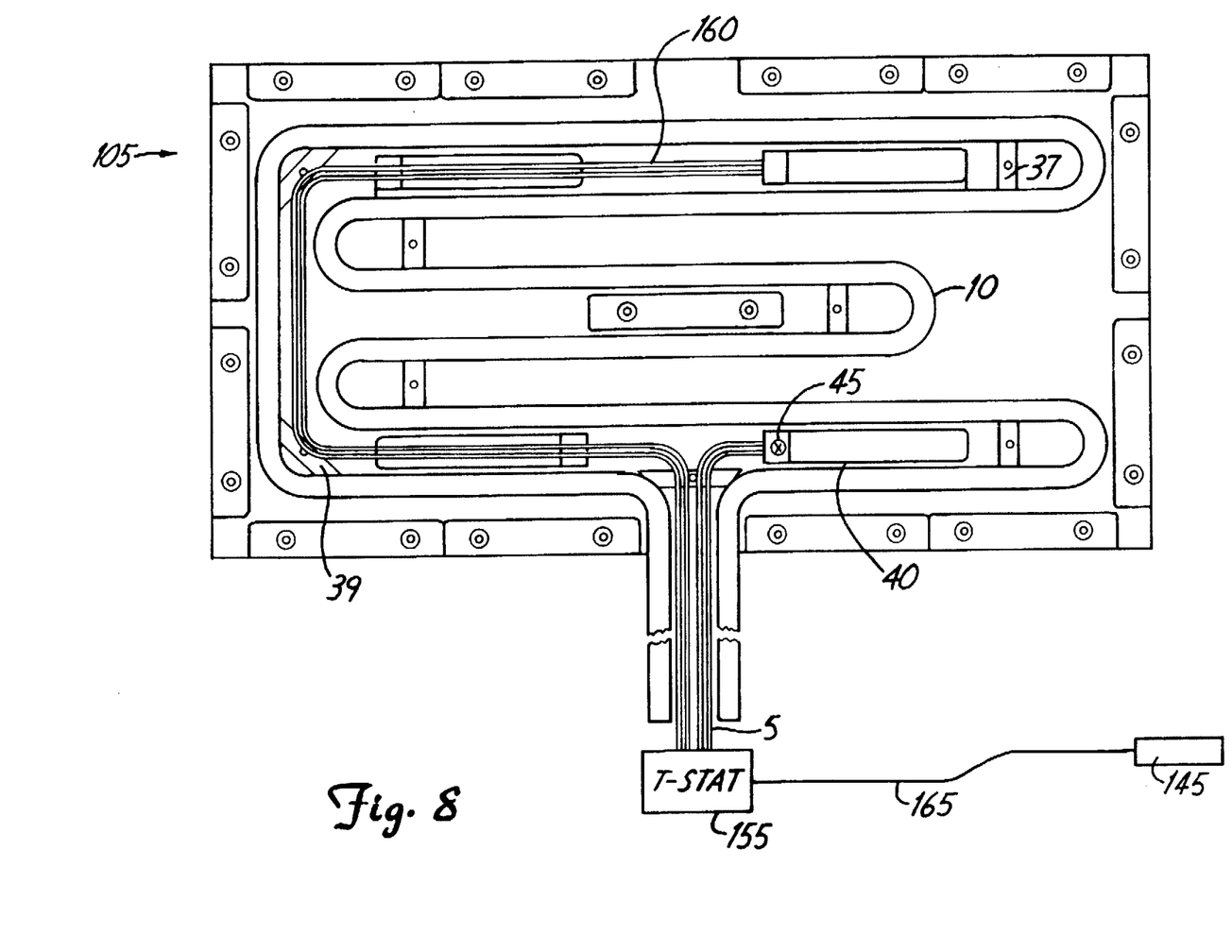
FIG. 8 is a bottom view of a battery heating device according to an embodiment of the invention.

Battery heating device 105 of the FIGS. 6A–6B embodiment also includes one or more electric heating pads 40, placed in a region of thermal conductivity with batteries 103 within the loops formed by tube 10 and/or outside of the loops. One possible arrangement of pads 40 is illustrated in FIG. 8, as will be described. Other features of the FIGS. 6A–6B embodiment are similar to those of battery heating device 5 of FIGS. 1–5, but description and illustration thereof are eliminated to simplify and clarify the disclosure.

The battery heating system of which battery heating device 105 is a part includes bypass thermostat 110. Bypass thermostat 110 receives heatable fluid, preferably engine coolant, at inlet port 112. A temperature sensing device, such as probe 125, is positioned in close proximity with batteries 103 as shown, to sense whether a temperature associated with batteries 103 is below a desired minimum temperature. In accordance with that determination, thermostat 110 directs coolant to and from extension lines 117, which are connected to tube 10 of battery heating device 105. After passing through tube 10 and thereby transferring thermal energy to heat batteries 103, coolant returns to thermostat 110 and exits at coolant outlet port 114. Thus, thermostat 110 and temperature probe 125 can be set to direct coolant toward tube 10 only when temperature probe 125 detects a temperature that is below a predetermined minimum temperature, for example, 80° Fahrenheit. If temperature probe 125 detects a temperature above the predetermined minimum, thermostat 110 causes coolant flow to bypass tube 10 and immediately exit at coolant outlet 114.

FIG. 6B also illustrates phase-change material reservoir 110, which can be used in combination with coolant tube 10 and electric heating pad(s) 40 to better provide thermal energy transfer to batteries 103 as the phase-change material in reservoir 110 changes from liquid form to solid form. Tube 10 can lie within reservoir 110 so that the phase-change material directly contacts tube 10, or tube 10 can lie above the phase-change material. Further, tube 10 can extend downwardly into reservoir 110 to provide additional contact area with the phase-change material. According to a preferred embodiment, the phase-change material is lithium nitrate, although a wide variety of suitable phase-change materials can be used.

Figure 7A:
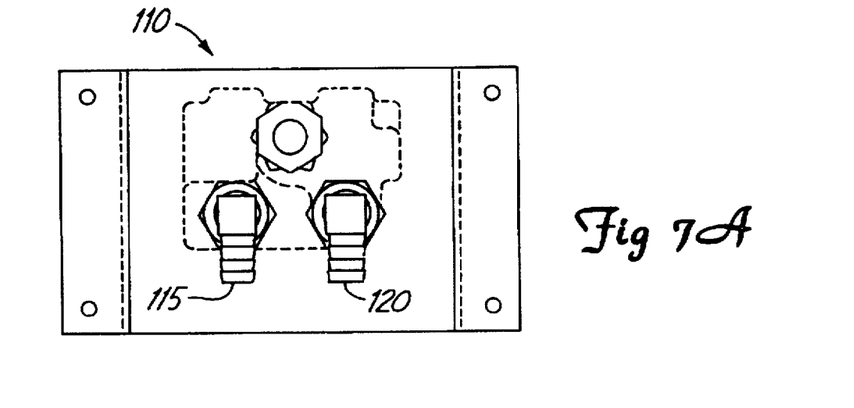
FIGS. 7A-7C are rear, side, top and front views of a bypass thermostat usable with a battery heating system according to an embodiment of the invention.
Figure 7B:
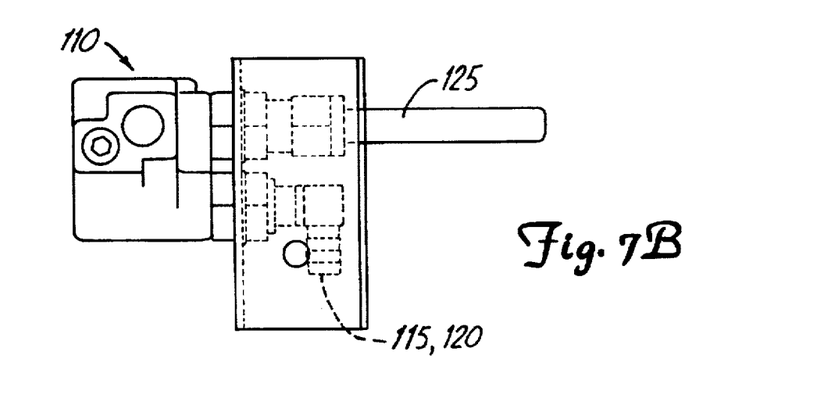
Figure 7C:
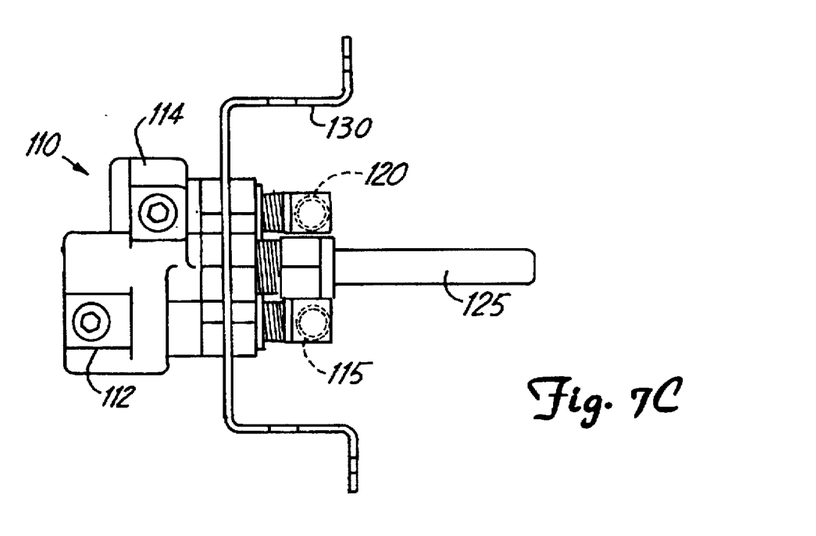

FIGS. 7A–7C illustrate bypass thermostat 110 in greater detail. Coolant inlet/outlet ports 115, 120 direct coolant to/from coolant lines 117 connected to tube 10. Support bracket 130 can support thermostat 110 on a housing for batteries 103, or at another desired location. Temperature probe 125, in addition to activating coolant flow to tube 10 to regulate the temperature associated with batteries 103, can also activate electric heating pad or pads 40. Alternatively, of course, electric heating pad or pads 40 can have their own dedicated temperature sensing device(s), either at the pads or at another location, and a remote temperature sensing device can be used in place of or in addition to probe 125. Bypass thermostat 110 preferably is constructed in accordance with the disclosure of U.S. Pat. No. 4,964,376, which is incorporated herein by reference.

As mentioned earlier, FIG. 8 shows one possible placement of electric pads 40 in relation to a tube configuration similar to that of FIGS. 6A–6B. Four electric heating pads 40 are disposed within two outer loops of tube 10, as illustrated. Again, however, alternative placements are contemplated within the scope of the invention.

The battery heating device 105 of FIG. 8 includes thermostat 155 for activating/deactivating electric heating pads 40 as needed to maintain a desired temperature. Each heating pad 40 or just one of the pads 40 can include a temperature sensing device 45, coupled to thermostat 155 by leads 160. Alternatively, or in combination with temperature sensing device(s) 45, remote temperature sensing device 145, connected to thermostat 155 by lead 165, can be used to sense temperature at or in close proximity to batteries 103. Of course, thermostat 155 with temperature sensing devices 45 and/or 145 can also be used to control coolant flow through tube 10.

Figure 9:
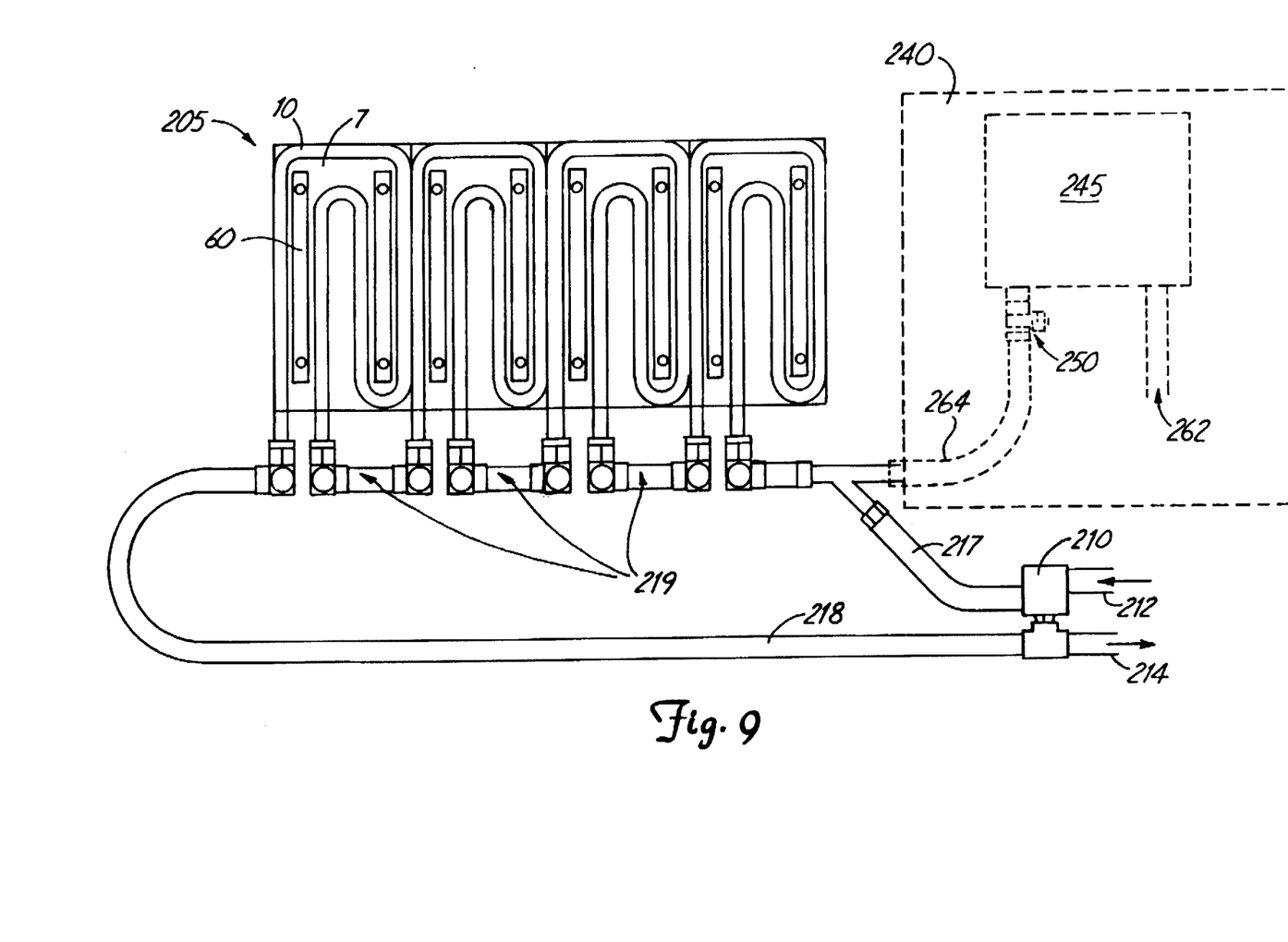
FIG. 9 is a schematic view of a battery heating system according to an embodiment of the invention.

FIG. 9 shows battery heating device 205 within a battery heating system according to an alternative embodiment of the invention. The battery heating system of FIG. 9 includes a cab heater loop 240, which includes cab heater 245. Cab heater shut-off valve 250 is a manual or automatic control that the occupant of a vehicle cab adjusts to regulate the temperature level of the cab. When valve 250 is open, coolant enters cab heater 245 at coolant inlet 262 and exits via extension line 264.

According to this embodiment, battery heating tube 10 is plumbed in series with cab heater 245, so that heat is directed to the battery system whenever heat is directed to the cab. The occupant of the cab thus not only controls the temperature of the cab, but also controls when battery heat is delivered as well.

Engine coolant is also directed to battery heating tube 10 through coolant inlet 212, thermostat 210 and extension line 217, as shown. After passing through tube 10 to heat the battery, coolant exits the loop through line 218 and coolant outlet 214. Thermostat 210 senses the temperature of coolant exiting line 218, shutting off flow at inlet 212 and/or outlet 214 when the temperature is at or above a predetermined level, i.e., when battery heating no longer is desirable.

The loop configuration of tube 10 illustrated in FIG. 9 differs from that of previous embodiments, and includes jumper extensions 219 to carry fluid from one section of battery supporting plate 7 to another. In the FIG. 9 embodiment, battery support plate 7 provides support for four separate batteries, as in the embodiment of FIGS. 6A–6B. Also as with previous embodiments, skids 60 are secured to the lower surface of the battery support plate 7.

While the present invention has been described with reference to particular preferred embodiments, the invention is not limited to the specific examples given. Various modifications will occur to those of ordinary skill. For example, the tube configuration and/or the cab heater loop shown in FIG. 9 can be used with any of the previous embodiments. Any of the specific features shown with respect to a particular embodiment can be used with the other embodiments. Heatable fluids other than engine coolant can be used. Other embodiments and modifications can be made by those skilled in the art without departing from the spirit and scope of the invention as defined in the following claims.

What is claimed is:

1. A battery heating device for delivering thermal energy to at least one vehicle battery, the battery heating device comprising in combination:

battery support structure for supporting the at least one battery;

heatable fluid accommodation means, thermally coupled with the at least one battery, for accommodating heatable fluid in a region of thermal conductivity with the at least one battery such that thermal energy is transferred from the heatable fluid to the at least one battery to heat the at least one battery; and     electric heating means, thermally coupled with the at least one battery, for generating thermal energy in a region of thermal conductivity with the at least one battery such that thermal energy is transferred from the electric heating means to the at least one battery to heat the at least one battery;

wherein the battery support structure comprises battery support means, coupled with the heatable fluid accommodation means and the electric heating means, for supporting the at least one battery in a predetermined location, the battery support means being thermally conductive to transfer thermal energy from the heatable fluid accommodation means and the electric heating means to the at least one battery;

wherein the battery support means comprises a plate having upper and lower surfaces;

wherein the upper surface of the battery support means plate is constructed to support the at least one battery; and wherein the lower surface of the battery support means plate supports the heatable fluid accommodation means and the electric heating means.

2. The battery heating device of claim 1, further comprising thermally conductive adhesive means for securing the heatable fluid accommodation means to the battery support means.

3. The battery heating device of claim 2, wherein the adhesive means comprises an epoxy resin continuously applied between the heatable fluid accommodation means and the battery support means to conduct thermal energy between the heatable fluid accommodation means and the battery support means.

4. The battery heating device of claim 1, wherein the electric heating means comprises a heat-generating pad secured to the battery support means.

5. The battery heating device of claim 1, further comprising phase-change material accommodation means, thermally coupled with the at least one battery, for accommodating a phase-change material such that thermal energy is transferred from the phase-change material to the at least one battery as the phase-change material changes from liquid form to solid form.

6. The battery heating device of claim 1, wherein the heatable fluid comprises engine coolant.

7. A battery healing device for delivering thermal energy to at least one vehicle battery, the battery heating device comprising:

a battery support plate for supporting the at least one battery;

a heatable fluid accommodating device thermally coupled with the at least one battery via the battery support plate to accommodate heatable fluid in a region of thermal conductivify with the at least one battery, thermal energy being transferred from the heatable fluid to the at least one battery via the battery support plate to heat the at least one battery; and an electric heating device thermally coupled with the at least one battery via the battery support plate to generate thermal energy in a region of thermal conductivity with the at least one battery, thermal energy being transferred from the electric heating device to the at least one battery via the battery support plate to heat the at least one battery.

8. The battery heating device of claim 7, wherein the heatable fluid accommodating device comprises a fluid-accommodating tube secured to a surface of the battery support plate to transfer thermal energy to the at least one battery via the battery support plate.

9. The battery heating device of claim 8, wherein the fluid-accommodating tube is bent to form at least one loop.

10. The battery heating device of claim 9, wherein the electric heating device comprises a heat-generating pad secured to the battery support plate within the at least one loop of the fluid-accommodating tube.

11. The battery heating device of claim 9, wherein the at least one loop of the fluid-accommodating tube comprises at least two legs, the battery heating device further comprising at least one cross-brace secured between the at least two legs, the fluid-accommodating tube being secured to the battery support plate at least in part by securing elements extending through the at least one cross-brace into the battery support plate.

12. The battery heating device of claim 8, further comprising a thermally conductive adhesive continuously disposed between the fluid-accommodating tube and the battery support plate, thermal energy being transferred from the heatable fluid to the at least one battery via the fluid-accommodating tube, the thermally conductive adhesive, and the battery support plate.

13. The battery heating device of claim 7, further comprising a phase-change material accommodation device thermally coupled with the at least one battery to accommodate a phase-change material, thermal energy being transferred from the phase-change material to the at least one battery as the phase change material changes from liquid form to solid form.

14. The battery heating device of claim 7, in further combination with:

a heatable fluid delivery system coupled with the heatable fluid accommodating device to selectively deliver a continuous flow of heatable fluid to the heatable fluid accommodating device; and a fluid bypass thermostat coupled with the heatable fluid delivery system, the fluid bypass thermostat comprising a temperature detection device in thermal communication with the at least one battery to detect a temperature associated with the at least one battery, the temperature detection device activating the fluid bypass thermostat to stop flow of the heatable fluid to the heatable fluid accommodating device by the heatable fluid delivery system when the temperature detected by the temperature detection device exceeds a predetermined value.

15. The battery heating device of claim 7, further comprising at least one support device secured to a bottom surface of the battery support plate, the at least one support device having a height dimension that is greater than a height dimension of the heatable fluid accommodating device to prevent contact of the heatable fluid accommodating device with any underlying structure.

16. The battery heating device of claim 7, wherein the battery heating device comprises weight-bearing structure to bear the weight of the at least one battery, the weight-bearing structure comprising the battery support plate, further wherein the weight-bearing structure bears the weight of the at least one battery independently of the heatable fluid accommodation means.

17. A method of delivering thermal energy to at least one vehicle battery, the method comprising:

(a) supporting the at least one battery with a battery support plate;

(b) transferring thermal energy to the at least one battery from heatable fluid in a region of thermal conductivity with the at least one battery via a heatable fluid accommodating device, a thermally conductive adhesive securing the heatable fluid accommodating device to the battery support plate; and (c) transferring thermal energy to the at least one battery from an electric heating device secured to the battery support plate in a region of thermal conductivity with the at least one battery.

18. The method of claim 17, wherein the step (b) comprises transferring thermal energy to the battery support plate from the heatable fluid accommodating device via an adhesive comprising an epoxy resin.

* * * * *